United States Patent [19]

Steensma

[11] 4,211,468
[45] Jul. 8, 1980

[54] METHOD AND APPARATUS TO PROVIDE A SECURE OPTICAL COMMUNICATION SYSTEM

[75] Inventor: Peter D. Steensma, Midland Park, N.J.

[73] Assignee: International Telephone and Telegraph Corporation, New York, N.Y.

[21] Appl. No.: 627,584

[22] Filed: Oct. 31, 1975

[51] Int. Cl.$^2$ ............................ G02B 5/14; H04B 9/00
[52] U.S. Cl. .............................. 350/96.10; 350/96.30; 455/612
[58] Field of Search ............. 350/96 R, 96 WG, 96 B, 350/96.10, 96.30; 250/199, 227; 332/7.51; 179/1.5 R, 1.5 M; 178/22, DIG. 2

[56] References Cited

U.S. PATENT DOCUMENTS

| | | | |
|---|---|---|---|
| 2,531,951 | 11/1950 | Shamos et al. ...................... | 250/199 |
| 3,633,034 | 1/1972 | Uchida et al. ................. | 350/96 B X |
| 3,643,097 | 2/1972 | Ueki et al. ................. | 350/96 WG X |

Primary Examiner—Nelson Moskowitz
Attorney, Agent, or Firm—John T. O'Halloran; Alfred C. Hill

[57] ABSTRACT

The intelligence on an optical communication system is made secure by launching an intelligence modulated optical beam into the input end of an optical waveguide at a small angle with respect to the axis of the waveguide and launching a masking signal modulated optical beam into the input end of the waveguide at a high angle with respect to the axis of the waveguide. At the output end of the waveguide only the intelligence modulated optical beam is transmitted to an optical detector with the masking signal modulated optical beam being blocked from the detector. This prevents an intruder from separating the intelligence signal from the masking signal when observing the waveguide radially.

15 Claims, 2 Drawing Figures

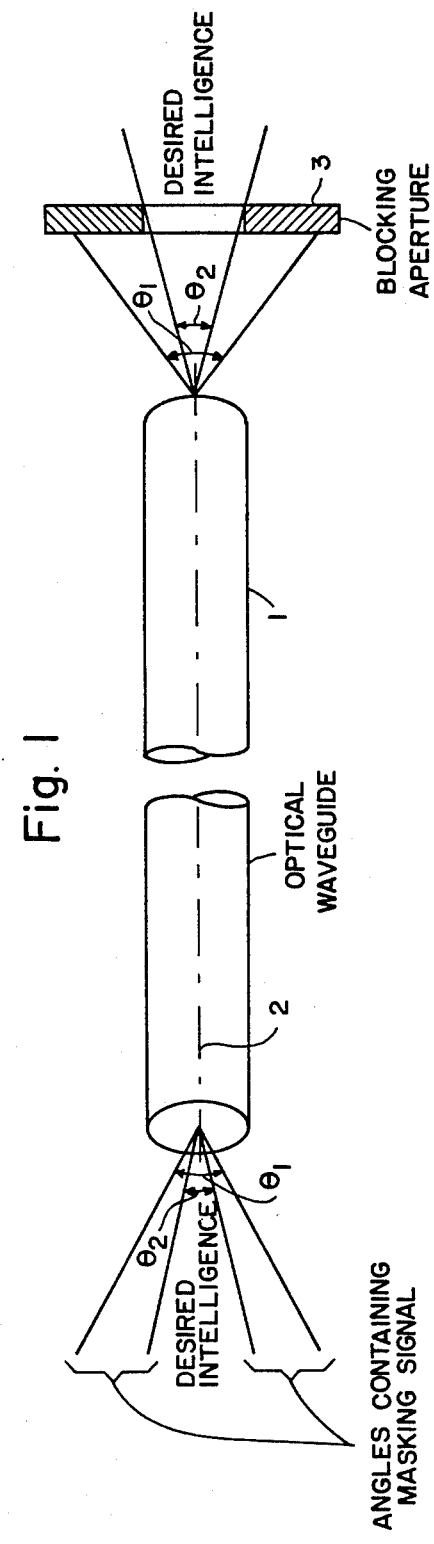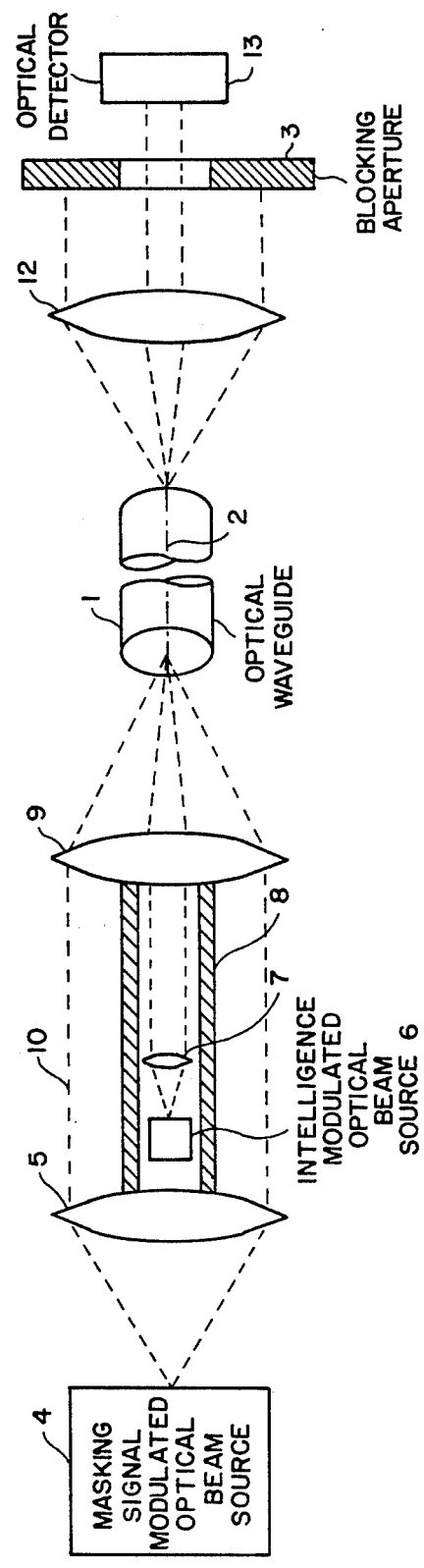

METHOD AND APPARATUS TO PROVIDE A SECURE OPTICAL COMMUNICATION SYSTEM

BACKGROUND OF THE INVENTION

This invention relates to intelligence communication systems and more particularly to a secure intelligence communication system.

The key to the securing of intelligence from detection during transmission always relies on providing the receiver with some key to the intelligence that allows him to remove the apparent randomness of the received intelligence and restore it to useful form. Conventionally this is done by transmitting an intelligence signal with many more dimensions or randomness than the intelligence content would require. The receiver possesses the key to sort out these dimensions or randomness and extract the intelligence. In conventional cryptographic equipment or source communication systems the randomness is achieved by modulo-2 addition of the intelligence with some very long repetition key sequence which is known to the receiver and the receiver then subtracts this sequence from the received signal to recover the intelligence.

SUMMARY OF THE INVENTION

An object of the present invention is to provide an improved method and equipment to provide a secure optical communication system.

A feature of the present invention is the provision of a method for rendering intelligence in an optical communication system secure comprising the steps of: launching an intelligence modulated optical beam into one end of an optical waveguide at a small angle with respect to the axis of the waveguide; and launching a masking signal modulated optical beam into the one end of the waveguide at a high angle with respect to the axis of the waveguide.

Another feature of the present invention is the provision of a secure optical communication system comprising: an optical waveguide having an axis; first means optically coupled to one end of the waveguide to launch an intelligence modulated optical beam into the one end of the waveguide at a small angle with respect to the axis; second means optically coupled to the one end of the waveguide to launch a masking signal modulated optical beam into the one end of the waveguide at a high angle with respect to the axis; third means optically coupled to the other end of the waveguide to transmit the intelligence modulated optical beam and to block the masking signal modulated optical beam; and fourth means optically coupled to the third means to recover the intelligence of the intelligence modulated optical beam.

BRIEF DESCRIPTION OF THE DRAWING

Above-mentioned and other features and objects of this invention will become more apparent by reference to the following description taken in conjunction with the accompanying drawing, in which:

FIG. 1 is a schematic diagram illustrating the method of providing a secure optical intelligence communication system in accordance with the principles of the present invention; and FIG. 2 is a schematic diagram in block form of apparatus for providing a secure intelligence optical communication system employing the method illustrated in FIG. 1 in accordance with the principles of the present invention.

DESCRIPTION OF THE PREFERRED EMBODIMENT

With optical waveguides many signal dimensions based on various modes of propagation are conveniently available to the sender and receiver, while the separation of these modes by an intruder observing the cable radially is difficult. Distribution of an intelligence modulated optical beam and a masking or jamming signal modulated optical beam, such as an optical beam modulated by random noise, among the different modes allows the achievement of security of the transmission of the desired intelligence against interpretation by an intruder.

Since each mode of optical waveguide 1 as illustrated in FIG. 1, where the optical waveguide may be a single optical fiber, has a well defined spatial frequency and hence direction of propagation, various mode groups emerge from the optical waveguide in a well defined cone. If an optical beam is injected at a cone angle $\theta$ into the input end of the optical waveguide 1, most of that energy will emerge from the output of the optical waveguide at the same cone angle. Higher cone angles have been demonstrated to be more accessible to an intruder than lower cone angles. Therefore, the method for securing intelligence in an optical communication system in accordance with the principles of the present invention is to inject a masking signal modulated optical beam into waveguide 1 at the higher cone angles $\theta_1$ with respect to the axis 2 of waveguide 1 and to inject the intelligence modulated optical beam that is desired to be obscured into waveguide 1 at smaller cone angles $\theta_2$ with respect to axis 2 of waveguide 1. The receiver which is optically coupled to the output of optical waveguide 1 can then extract the desired intelligence by blocking the angular components containing the masking signal modulated optical beam and transmitting only the angular components containing the desired intelligence modulated optical beam to an optical detector. This is accomplished by employing blocking aperture 3 which is directly optically coupled to the output of waveguide 1.

Referring to FIG. 2 there is illustrated therein the apparatus necessary to carry out the method described hereinabove with respect to FIG. 1. The masking signal modulated optical beam source 4, which is assumed to be small relative to the spherical lens 5, is placed at the focal point of lens 5, so that the optical beam from source 1 is converted to a parallel wavefront beam in the image plane. Source 4 may be implemented by a light emitting diode having the masking signal and bias coupled thereto to provide an optical beam which is intensity modulated by the masking signal. An intelligence modulated optical beam source 6 which may also be implemented by a light emitting diode having the intelligence signal applied thereto to vary an operating voltage there provides the intelligence modulated optical beam. Source 6 is placed at the focal point of lens 7 and similarly the intelligence modulated optical beam is formed into a parallel wavefront which is entirely contained in the hollow tube 8. The lens 9 converts both parallel optical beams to a converging wavefront whose focal point is the focal point of lens 9. At this focal point the input of optical waveguide 1 is placed. Since optical ray 10 has a greater distance from axis 2 of waveguide 1, ray 10 will be injected at a steeper angle into optical waveguide 1 than the more centrally disposed ray 11. The necessary injection condition in accordance with the method of the present invention has then been achieved.

The output optical beams from waveguide 1 can be operated on directly as shown in FIG. 1, or can be operated upon in conjunction with a lens 12 with the output end of waveguide 1 being disposed at the focal point of lens 12. The masking signal modulated optical beam is then blocked by blocking aperture 3 and the intelligence modulated optical beam is passed by blocking aperture 3 to an optical detector 13 which then can recover the intelligence modulation.

While I have described above the principles of my invention in connection with specific apparatus it is to be clearly understood that this description is made only by way of example and not as a limitation to the scope of my invention as set forth in the objects thereof and in the accompanying claims.

I claim:

1. A method for rendering intelligence in an optical communication system secure comprising the steps of:
    launching an intelligence modulated optical beam into one end of an optical waveguide at a small angle with respect to the axis of said waveguide;
    launching a masking signal modulated optical beam into said one end of said waveguide at a high angle with respect to the axis of said waveguide; and
    recovering only said intelligence modulated optical beam at the other end of said waveguide.

2. A secure optical communication system comprising:
    an optical waveguide having an axis;
    first means optically coupled to one end of said waveguide to launch an intelligence modulated optical beam into said one end of said waveguide at a small angle with respect to said axis;
    second means optically coupled to said one end of said waveguide to launch a masking signal modulated optical beam into said one end of said waveguide at a high angle with respect to said axis;
    third means optically coupled to the other end of said waveguide to transmit said intelligence modulated optical beam and to block said masking signal modulated optical beam; and
    fourth means optically coupled to said third means to recover said intelligence of said intelligence modulated optical beam.

3. A system according to claim 2, wherein
said first means includes
    a hollow tube having a given diameter disposed coaxial of said axis and spaced from said one end of said waveguide,
    a first source of said intelligence modulated optical beam disposed coaxial of said axis within said hollow tube,
    a first lens optically coupled to said first source to provide a parallel wavefront for said intelligence modulated optical beam, said first lens being disposed coaxial of said axis within said hollow tube, and
    a second lens having a predetermined diameter greater than said given diameter disposed coaxially of said axis and at an end of said hollow adjacent said waveguide, said second lens converting said parallel wavefront of said intelligence modulated optical beam into a first converging wavefront; and
said second means includes
    a second source of said masking signal modulated optical beam disposed coaxial of said axis adjacent an end of said hollow tube remote from said waveguide,
    a third lens having a diameter equal to said predetermined diameter disposed coaxially of said axis and at an end of said hollow tube remote from said waveguide, said third lens providing a parallel wavefront for said masking signal modulated optical beam, and
    said second lens to convert said parallel wavefront for said masking signal modulated optical beam into a second converging wavefront.

4. A system according to claim 3, wherein
said first source is disposed at the focal point of said first
said second source is disposed at the focal point of said third lens, and
said one end of said waveguide is disposed at the focal point of said second lens.

5. A system according to claim 3, wherein
said third means includes
    a blocking aperture optically coupled to said other end of said waveguide.

6. A system according to claim 5, wherein
said fourth means includes
    an optical detector optically coupled to said blocking aperture.

7. A system according to claim 3, wherein
said third means includes
    a fourth lens optically coupled to said other end of said waveguide, and
    a blocking aperture optically coupled to said fourth lens.

8. A system according to claim 7, wherein
said fourth means includes
    an optical detector optically coupled to said blocking aperture.

9. A system according to claim 7, wherein
said other end of said waveguide is disposed at the focal point of said fourth lens.

10. A system according to claim 2, wherein
said third means includes
    a blocking aperture optically coupled to said other end of said waveguide.

11. A system according to claim 10, wherein
said fourth means includes
    an optical detector optically coupled to said blocking aperture.

12. A system according to claim 2, wherein
said third means includes
    a lens optically coupled to said other end of said waveguide, and
    a blocking aperture optically coupled to said lens.

13. A system according to claim 12, wherein
said fourth means includes
    an optical detector optically coupled to said blocking aperture.

14. A system according to claim 12, wherein
said other end of said waveguide is disposed at the focal point of said fourth lens.

15. A system according to claim 2, wherein
said fourth means includes
    an optical detector optically coupled to said other end of said waveguide.

* * * * *